Patented May 5, 1942

2,281,759

UNITED STATES PATENT OFFICE 2,281,759

SEWAGE TREATMENT

Royal W. Gelder, Greeley, Colo., assignor to Paul Bechtner, Chicago, Ill.

No Drawing. Application October 29, 1935, Serial No. 47,222. Renewed April 20, 1939

10 Claims. (Cl. 210—2)

This invention relates to a method of treating sewage or other impure waters and to a product suitable for use in such treatment. It further contemplates the provision of a process for making the aforementioned product.

It has for an object to provide a chemical process of treatment whereby sewage may be clarified by the removal of colloidal and non-settleable suspended matter and may be further purified by the decomposition of putrescible organic crystalloids.

A further object of the invention is to increase the fertilizing value of digested sewage sludge by preserving therein considerable quantities of nitrogen heretofore lost in the form of soluble nitrogenous compounds in the supernatant effluent from digestion tanks.

Still another object of the invention is to provide an agent or reaction product suitable for use in the treatment according to the present method, and that may be introduced into a body of sewage or other impure water in order to effect the above objects.

While the present method and product for use in carrying out the same are applicable particularly in the treatment of sewage, and for the purpose of convenience, their use in such a connection will be hereinafter described, it is understood that the method and product may be used with equal success in the treatment of any impure waters containing colloidal and non-settleable suspended matter. Wherever, in the specification and claims, the word "sewage" is used it will be understood that this term is intended to include sewage, sewage sludge or other impure water containing colloidal and non-settleable suspended matter.

In accordance with the present invention, it has been found that when an aqueous colloidal suspension of a suitable clay is coagulated by means of an inorganic crystalloidal electrolyte there is formed by the pectization an irreversible floc. The flocs of this reaction product when the product is dispersed in sewage, exhibit a strong coagulating power in flocculating colloidal and non-settleable suspended matter in the sewage. The flocs produced by the coagulation of sewage in this manner are characterized by high settleability and by great stability over wide ranges of hydrogen ion concentration.

The coagulating power of the dispersed clay floc is thought due to reactions with urea, albuminoid, or other organic nitrogenous crystalloids in solution in the sewage, for my process is not only effective in the flocculation of colloidal and non-settleable suspended matter, but also in the decomposition of dissolved putrescible nitrogenous substances therein and in the removal from solution of a considerable quantity of nitrogen normally lost in effluent dissolved solids.

In carrying out my invention, I prefer to use a clay having high gelatinizing or colloidal properties which, when brought into suspension in water, being in colloidal phase is virtually non-settleable, such as a true bentonite, although other suitable gelatinizing or highly colloidal clay may be used with effective result.

The clay is first brought into suspension by agitation with water in a Turbo Mixer, using, say, fifty parts of water by weight to one part of dry clay or six gallons of water per pound of clay. The aqueous suspension of clay is next slowly agitated in a tank of suitable capacity to provide a detention period of two hours for maximum feed requirements to insure proper hydration of colloidal particles, the agitation being sufficient to produce homogeneity and to prevent sedimentation or short circuiting.

The clay suspension effluent from the detention tank is next flocculated with an inorganic electrolyte. Due to the fact that a floc produced by the coagulation of the clay suspension is irreversible in part over the entire pH scale, a great deal of latitude is possible in the selection of an electrolyte to flocculate the same, as well as in the control of hydrogen ion concentration in the sewage treated. For example, I find that alkaline, neutral, and acid electrolytes can be used, such as the water soluble salts of the alkaline earths and the trivalent metals and also hydrochloric and sulphuric acids.

While it is sometimes desirable in the control of organic coloring and of trade wastes to have an acid coagulation of sewage, it is normally desired, for the control of odors and for optimum sludge digestion conditions, to adjust the alkalinity of the sewage to a pH of 7.4 or higher. In the usual practice, therefore, I prefer to use hydrated lime as the electrolyte to produce the flocculation of the clay suspension.

The clay suspension effluent from the detention tank is next led into a suitable mixing apparatus and there is mixed with hydrated lime, the latter being preferably introduced into the mixer in the form of milk of lime to avoid undue thickening of the mixture in the process of flocculation.

The usual dosage of suspended clay is from two to six grains by dry weight of clay to each gallon of sewage treated, depending on the turbidity of the sewage and the oxygen demand thereof. The quantity of lime used for intermixture with the clay suspension varies with the pH adjustment requirements of the sewage, at least one part by dry weight of lime being used for each two parts by dry weight of clay, and sufficient additional lime being added to adjust the alkalinity of the sewage to the desired pH.

The mixture of suspended clay and hydrated lime, after a short period of mixing to produce flocculation, is fed into the sewage and dispersed therein to virtual colloidal condition by means of mechanical agitation with the sewage for a period of ten minutes or more in a flocculator or other suitable mixing apparatus. By this dispersion the floc particles are brought into contact with colloidal and crystalloidal matter in the sewage and react therewith to produce coagulation.

The sewage is then led into a clarifier or other sedimentation tank providing, preferably, a detention or settlement period of one and one-half hours or more, and the settled sludge is conveyed to a digester, or, in case the sludge is to be dried, to a vacuum filter and dryer.

As a further purification measure and in order to preserve in digested or partly digested sludge a considerable quantity of nitrogen otherwise normally lost in the supernant waste from digestion tanks, I find it advantageous to introduce into such tanks, either with the sewage sludge or independently thereof, a quantity of the flocculated clay in excess of that required for coagulation purposes as above described.

This I accomplish by introducing excess clay floc into the sewage and conveying the same in the settled sludge to the digestion tank, or by introducing the floc, without prior contact with the sewage, into the digestion tank and agitating the floc with the sludge by mechanical means to effect a mixture of the same and the comminution of the floc particles in the sludge.

My process is equally effective as a means of conditioning sewage sludge for vacuum filtration and drying, for the addition of clay floc to the sludge not only effects a purification of the filtrate from such treatment and the preservation of nitrogen in the residue, but also serves to expedite filtration.

In the conditioning of sludge for filtration by my process, hydrated lime is added in dry form to the clay suspension as described in sufficient quantity to sweeten the sludge and prevent odors during the treatment and the flocculated mixture is mixed mechanically with the sewage sludge prior to filtration. The quantity of floc used is naturally dependent upon whether or not my process has been used in sedimentation of the sludge, a smaller quantity being required for conditioning of the sludge for filtration if the flocculated clay has been used to effect coagulation of the sewage in advance of conditioning of the sludge.

The present process, in addition to being more effective and economical than methods hitherto used in the chemical purification of sewage, possesses a number of advantages not herein before enumerated:

Sludge produced from the process, whether digested or filtered and dried, is relatively high in nitrogen and is free from introduced iron, making it desirable for fertilizing purposes; the process is not attended by difficulties due to corrosive electrolytes such as the ferric salts; the process serves to reduce instead of to increase the hardness of the effluent from the treatment plant; and the process produces a better appearing effluent for the same degree of purification than do the ferric salts, due to the fact that suspended floc particles are white and do not discolor the effluent.

While electrolytes such as ferric chloride, ferric sulphate, and chlorinated copperas have hitherto been used to clarify sewage by coagulation of the colloidal matter therein and have proven effective in this respect, such electrolytes have not been proportionately effective in the decomposition of putrescible soluble organic substances, and accordingly, in the reduction of oxygen demand of the effluent sewage. Moreover, the iron coagulants produce a sludge of little fertilizing value.

By comparison with my present process, the use of ferric electrolytes or of copperas and chlorine is relatively expensive and is attended by a number of difficulties, such as severe corrosion troubles, increased hardness of effluent, and unsightly discoloration of effluent due to the presence of suspended brown ferric hydrate floc.

What is claimed is:

1. The treatment of sewage or other impure waters which comprises the addition thereto and dispersion therein of an aqueous suspension of flocculated bentonite, the same comprising the reaction product formed by mixing and reacting an aqueous colloidal suspension of bentonite with an inorganic flocculating electrolyte.

2. The process of treating sewage sludge which comprises adding thereto and mixing therewith an aqueous suspension of flocculated bentonite, the same comprising the reaction product formed by mixing and reacting an aqueous colloidal suspension of bentonite with hydrated lime.

3. The process of treating sewage sludge which comprises coagulating an aqueous suspension of bentonite by agitating the same with hydrated lime, introducing the flocculated mixture into a sewage sludge digestion tank, and dispersing the floc in the sewage solids in said tank.

4. The process of treating sewage which comprises agitating bentonite with fifty parts of water by weight to each part of dry bentonite to effect an aqueous suspension of said bentonite, agitating the suspension slowly for a period of time to effect hydration of the colloidal particles, treating the hydrated colloidal suspension with one part of lime by dry weight in hydrate form to each two parts by dry weight of bentonite, agitating the mixture to produce flocculation, introducing the flocculated mixture into the sewage and agitating the same with the sewage to disperse the floc throughout the sewage, and settling out the resulting coagulum.

5. The process of treating sewage which comprises agitating highly colloidal clay with fifty parts of water by weight to each part of dry clay to effect an aqueous suspension of said clay, agitating the suspension slowly for a period of time to effect hydration of the colloidal particles, treating the hydrated colloidal suspension with one part of lime by dry weight in hydrate form to each two parts by dry weight of clay, agitating the mixture to produce flocculation, introducing the flocculated mixture into the sewage and agitating the same with the sewage to disperse the floc throughout the sewage, and settling out the resulting coagulum.

6. The process of treating sewage or other impure waters which comprises agitating highly colloidal clay with water to effect an aqueous suspension of said clay, agitating the suspension for a period of time to effect hydration of the colloidal particles, mixing hydrated lime with the hydrated colloidal suspension to produce flocculation thereof, introducing the flocculated mixture into the sewage and agitating the same with the sewage to disperse the floc therethroughout, and settling out the resulting coagulum.

7. The process of treating sewage which comprises agitating highly colloidal clay with water to effect an aqueous suspension of said clay, agitating the suspension for a period of time to effect hydration of the colloidal particles, mixing a coagulating electrolyte with the hydrated colloidal suspension to produce flocculation thereof, introducing the flocculated mixture into the sewage and agitating the same with the sewage to disperse the floc therethroughout, and settling out the resulting coagulum.

8. The process of treating sludge derived from sewage or other impure waters which comprises agitating highly colloidal clay with water to effect an aqueous suspension of said clay, agitating the suspension for a period of time to effect hydration of the colloidal particles, mixing an inorganic electrolyte with the hydrated colloidal suspension to produce flocculation thereof, introducing the flocculated mixture into the sludge and dispersing the floc therethroughout, and ultimately dewatering the thus treated sludge.

9. The treatment of sewage which comprises the addition thereto and dispersion therein of an aqueous suspension of flocculated colloidal clay, the same comprising the reaction product formed by mixing and reacting an aqueous colloidal suspension of such clay with a solution of calcium hydrate.

10. The process of treating sewage which comprises flocculating an aqueous colloidal suspension of bentonite by agitating the same with milk of lime, introducing the flocculated mixture into the sewage and dispersing the floc throughout the sewage.

ROYAL W. GELDER.